April 1, 1941.  W. J. COULTAS ET AL  2,237,280
DUMP RAKE
Filed May 18, 1938  7 Sheets-Sheet 2
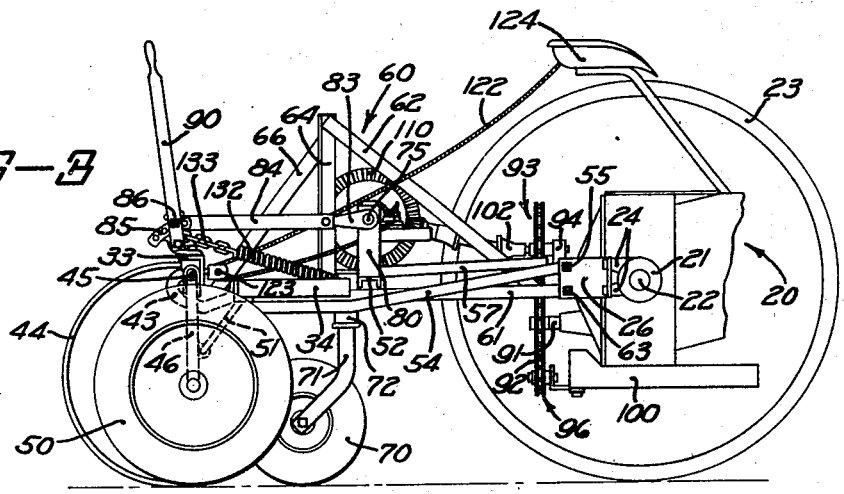
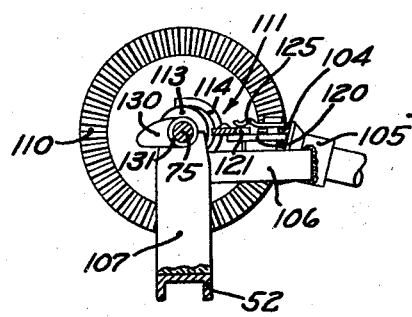
INVENTORS
Wilbur J. Coultas
and Nolan D. Colvin
BY
ATTORNEYS

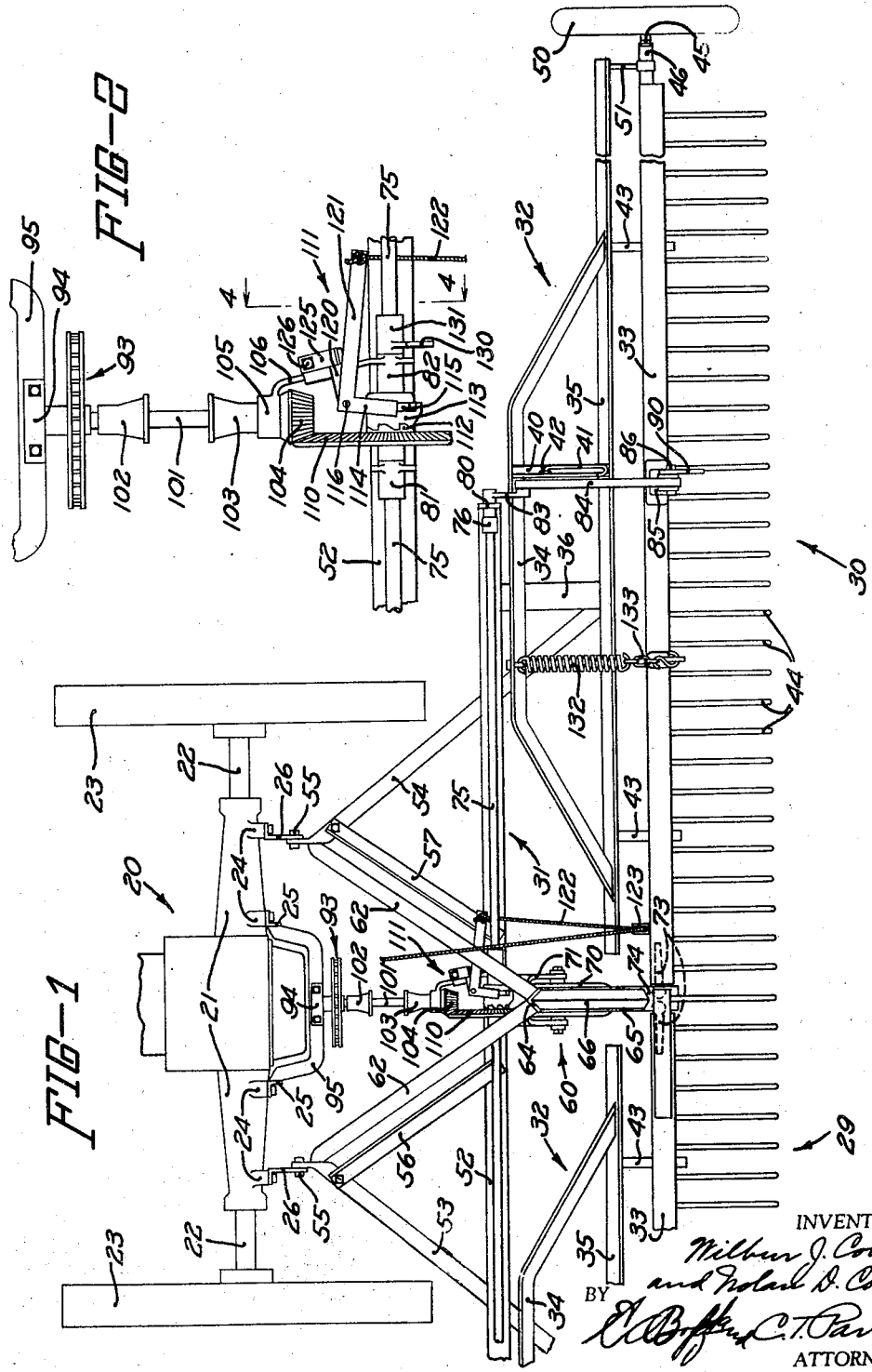

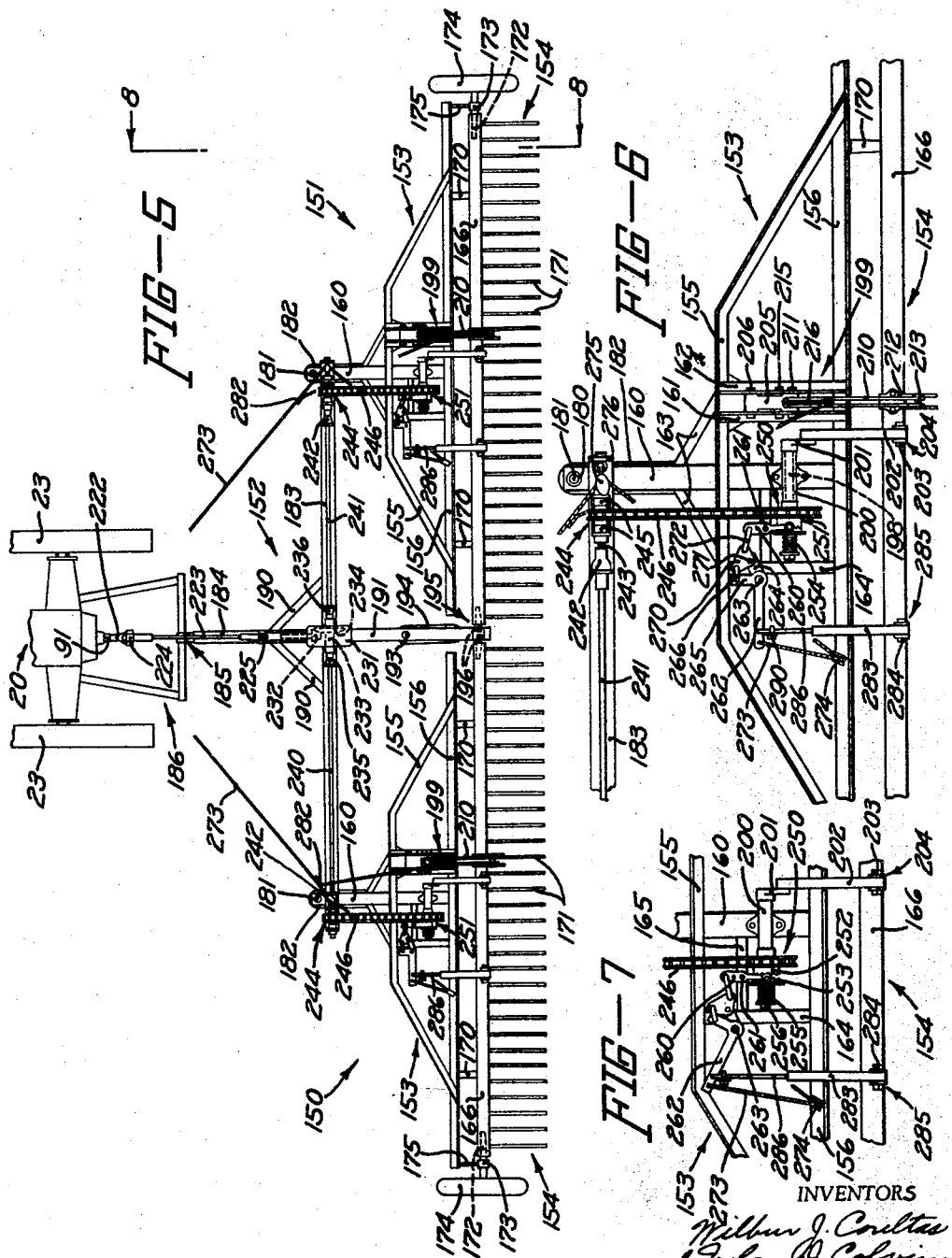

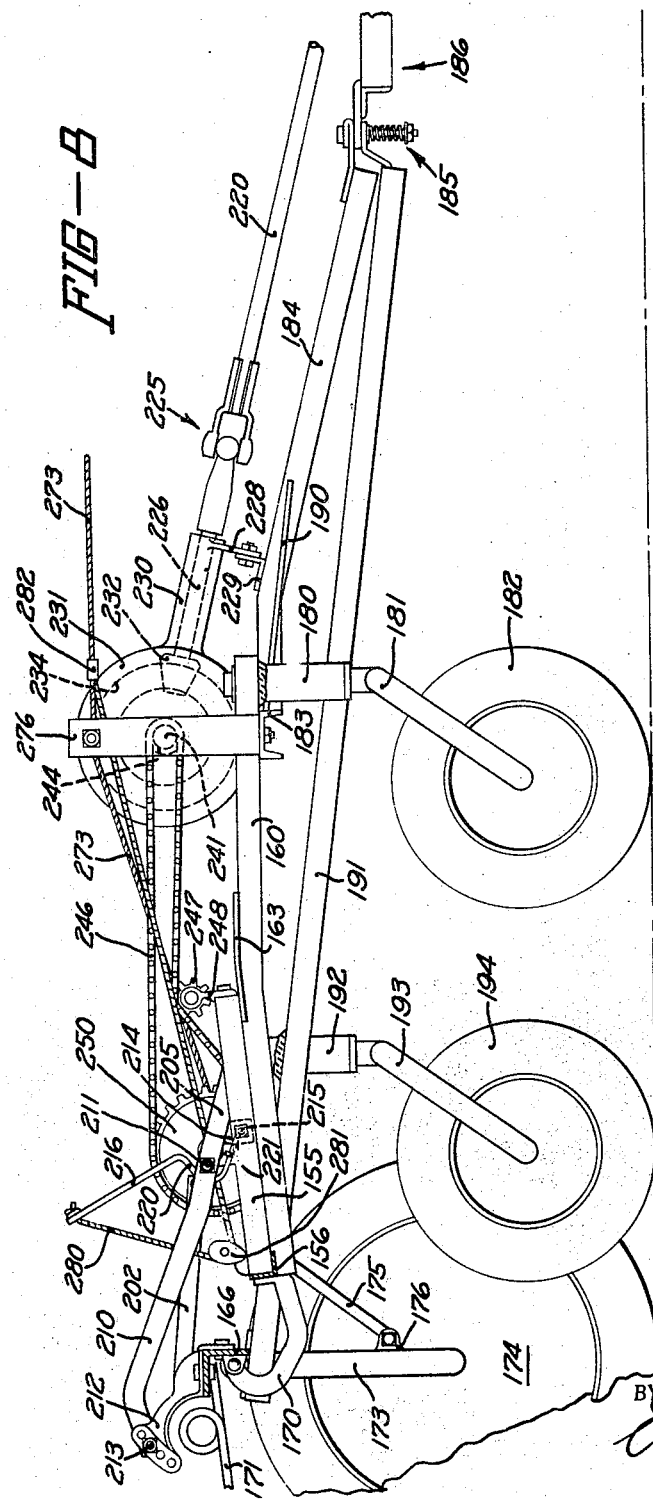

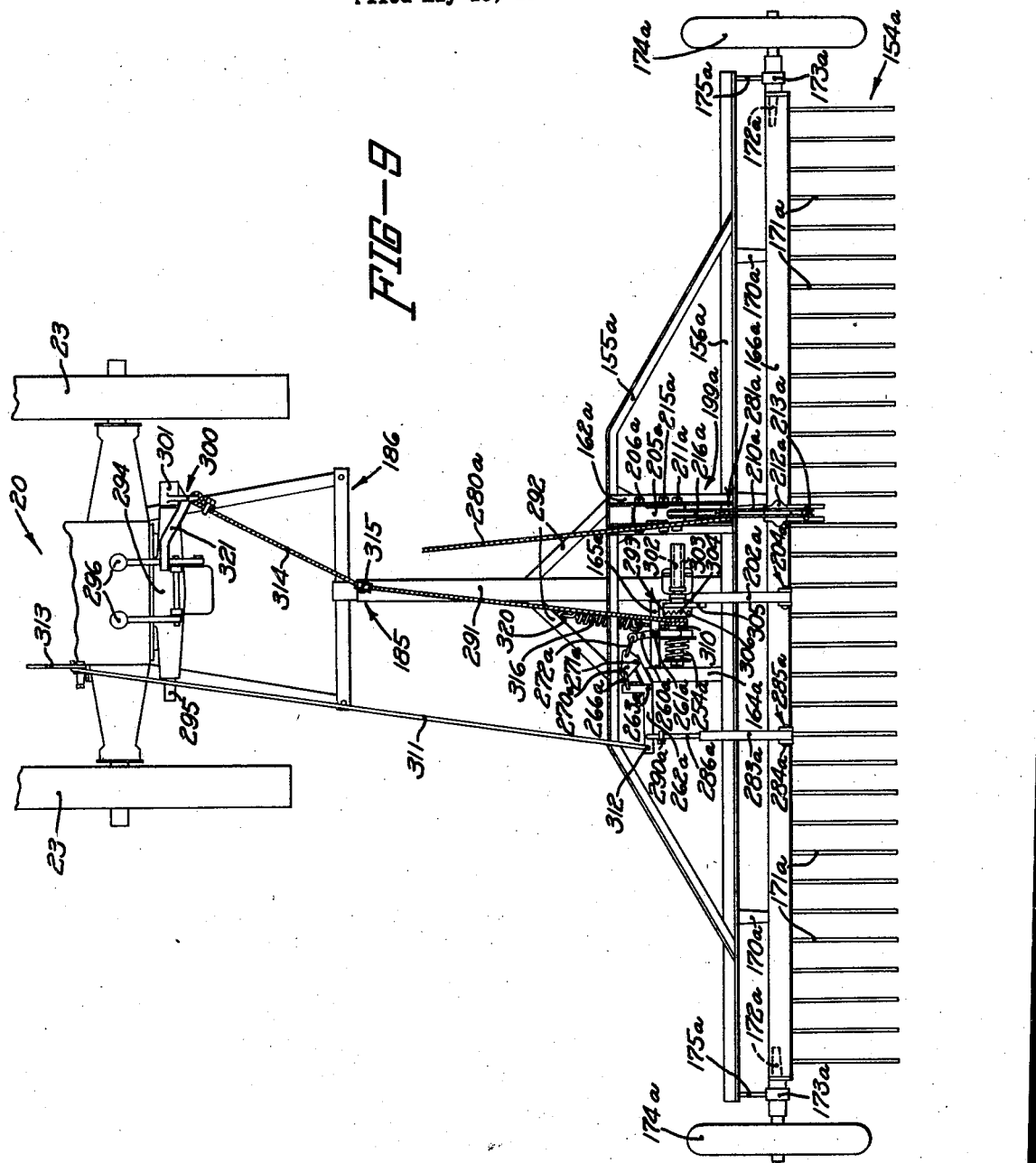

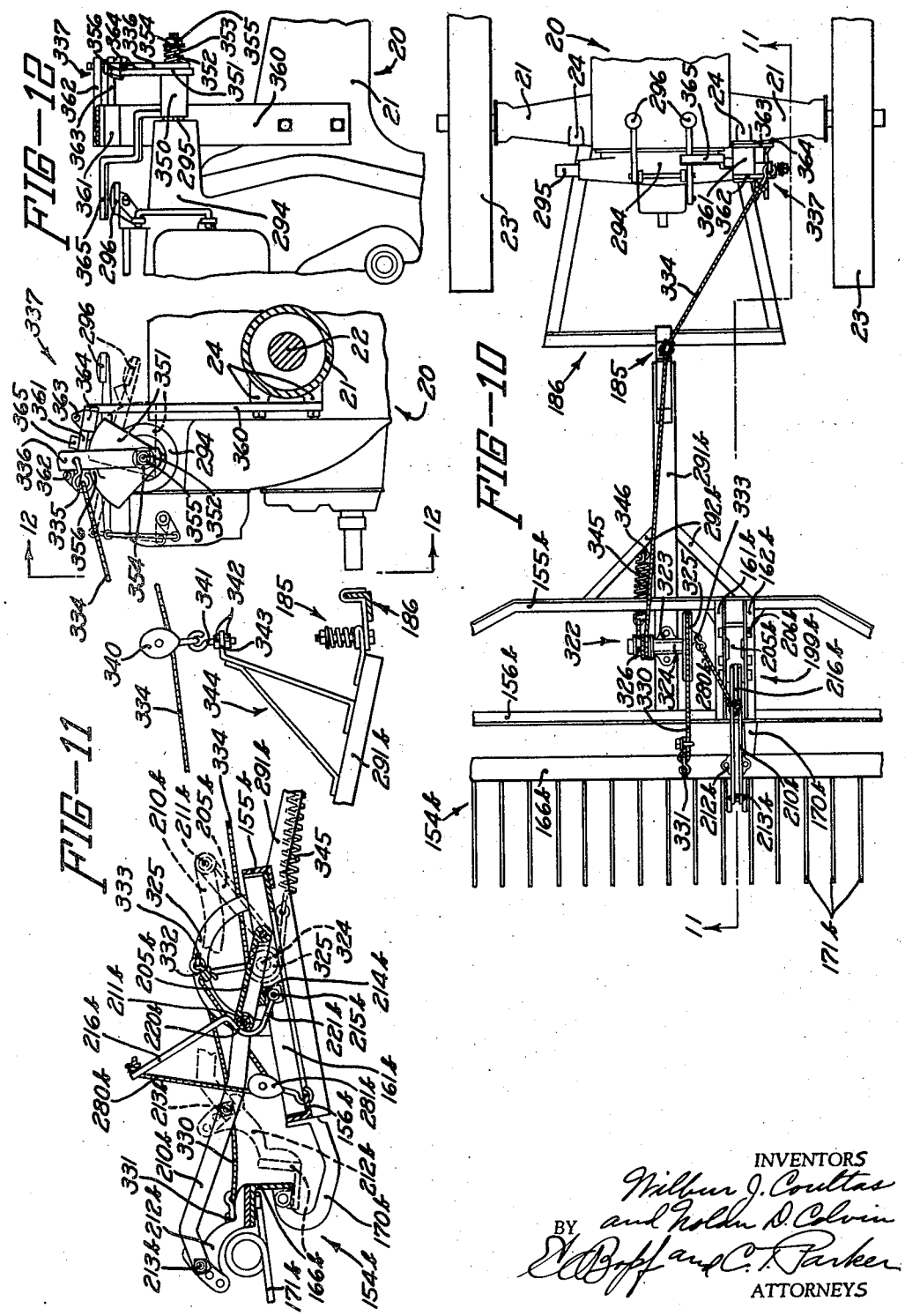

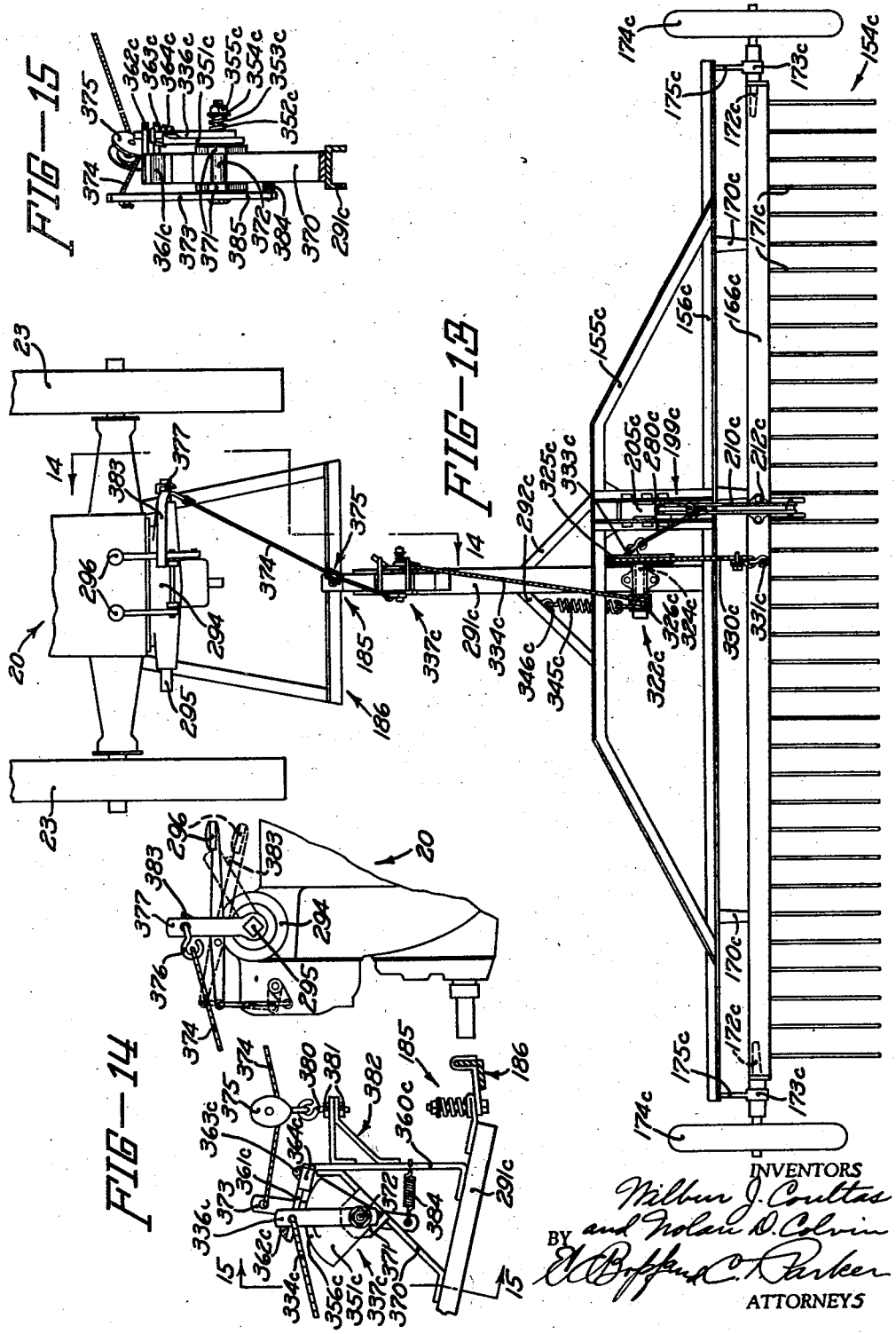

UNITED STATES PATENT OFFICE

2,237,280

DUMP RAKE

Wilbur J. Coultas and Nolan D. Colvin, Moline, Ill., assignors to Deere & Company, Moline, Ill., a corporation of Illinois Application May 18, 1938, Serial No. 208,592

32 Claims. (Cl. 56—27)

The present invention relates to tractor-drawn hay rakes, and has particular reference to rakes of the self-dumping type, wherein power derived from the propelling tractor is utilized to swing the hay gathering teeth from a gathering position upwardly to a dumping position for dumping the hay.

The principal object of the present invention is to provide a new and improved dump rake of this general type in which power is transmitted from the tractor engine through either the power takeoff shaft, power lift mechanism, or other driving member, back to suitable dumping means carried on the dump rake body and there utilized to dump the tooth-carrying rake head.

Another object is to provide a dump rake having two or more wheel supported rake sections which are connected to a tractor by means of a common draft frame and which are dumped by suitable dumping means carried on the draft frame and operated by power derived from the tractor engine.

Another object is to provide a dump rake having two or more rake sections, each section of which is provided with dumping mechanism for dumping its respective rake head, together with means for transmitting power from the tractor engine to each of the dumping mechanisms and control means for actuating the same.

Another object is to provide a dump rake having at least two rake sections enabling it to operate upon a wide swath and thereby utilizing the power of the propelling tractor to its fullest capacity.

These and other objects and advantages of the present invention will become apparent after consideration of the following detailed description of the preferred structural embodiments together with the drawings appended hereto, in which:

Figure 1 is a plan view of a portion of a tractor and attached two-section rake, the dumping mechanism being driven by power derived from the power takeoff shaft;

Figure 2 is a detail view, drawn to enlarged scale, of the power transmission system and self-interrupting clutch forming part of the dumping mechanism;

Figure 3 is a side elevation of the implement shown in Figure 1, the near wheel of the tractor being removed for a clearer showing of certain details;

Figure 4 is a sectional view taken along the line 4—4 of Figure 2;

Figure 5 is a plan view of another embodiment of the two-section rake, in which power is transmitted back from the power takeoff shaft to drive individual dumping mechanisms carried on each of the rake sections;

Figure 6 is an enlarged plan view of the dumping mechanism on one of the rake sections shown in Figure 5, showing the clutch engaged, as at the beginning of the dumping operation;

Figure 7 is a view similar to Figure 6, showing the clutch disengaged, as when the rake head is in normal raking position;

Figure 8 is a sectional side view, taken along the line 8—8 of Figure 5, and drawn to an enlarged scale;

Figure 9 is a plan view of a single-section rake in which power is transmitted back from the power lift mechanism to operate dumping mechanism of the self-interrupting clutch type mounted on the rake body;

Figure 10 is a plan view of a portion of a rake similar to that shown in Figure 9, illustrating a modified form of the dumping mechanism;

Figure 11 is an enlarged sectional view taken substantially along the line 11—11 of Figure 10 and having portions broken out in order to conserve space on the sheet;

Figure 12 is a rear view of a portion of the tractor power lift mechanism and device for interrupting the transmission of power, as taken along the line 12—12 of Figure 11;

Figure 13 is a plan view of another embodiment, similar to that shown in Figure 10, of a dump rake having power lift operated dumping mechanism, with the device for interrupting the transmission of power mounted on the rake body;

Figure 14 is an enlarged sectional view, taken along the line 14—14 of Figure 13, and broken out in portions to save space on the sheet; and Figure 15 is a detailed sectional view, taken along the line 15—15 of Figure 14.

Referring now to the drawings and more particularly to Figures 1-4 inclusive, the reference numeral 20 indicates a tractor of the type having a rear axle 22 journaled in a transverse axle housing 21, and traction wheels 23 mounted on the ends of the axle 22. The axle housing 21 is provided with two pairs of rearwardly facing implement mounting bosses 24 which are disposed symmetrically on opposite sides of the midpoint of the axle housing and are adapted to receive complementary mounting brackets such as angle brackets 25 and 26.

The dump rake itself comprises a pair of rake sections 29, 30 which are disposed to the rear of the tractor 20 and transversely thereof, and are connected to the tractor body by means of a draft frame 31. The rake sections 29, 30 are of conventional design, each comprising a frame 32 to which a tooth-carrying rake head is pivotally connected for swinging between raking and dumping positions. The frame 32 preferably comprises front and rear transverse bars 34, 35, and a longitudinal connecting bar 36 disposed intermediate the ends thereof. The end portions of the front bar 34 are bent back so that they diverge rearwardly and are connected with the rear bar 35. Also connecting the front and rear bars at a point somewhat to one side of the bar 36 is an angle bar 40 having a vertical flange to which a transport hook 41 is pivotally connected at 42. The rake head is of conventional design, and preferably comprises a transverse angle iron beam 33 which is pivotally supported on brackets 43 that are secured to the rear bar 35 at laterally spaced intervals and project rearwardly therefrom. The rake head 33 carries the usual rake teeth 44 which are secured to the under side of its horizontal flange and curve rearwardly and downwardly therefrom to within close proximity of the ground in raking position. The outer end of each of the rake heads 33 is provided with a stub shaft 45 upon which is journaled a crank axle 46, while the lower end of the crank axle 46 is bent laterally outward to provide a bearing upon which the carrying wheel 50 is journaled. The crank axle 46 is held vertical by a brace rod 51 which is fastened at one end to the rear frame bar 35 and connected at the other end to a lug provided on the crank axle 46.

The draft frame 31 preferably comprises a transverse channel iron beam 52 disposed across the front of the two rake sections 29, 30 and extending somewhat beyond the midpoints thereof. The front ends of the connecting bars 36 are fixed to the beam 52. Draft bars 53 and 54, fixed to the respective rear bars 35 of sections 29 and 30, extend forwardly in converging relation and are pivotally connected to angle brackets 26 by transverse pivot bolts 55. The channel iron beam 52 is braced in its middle portion by two bars 56, 57 which are fixed at their forward ends to shafts 53, 54, respectively, and extend rearwardly in converging manner and are connected with beam 52.

A secondary draft frame 60 supports the inner ends of the rake sections 29, 30 and also serves to stabilize the same, holding them in transverse alignment relative to the tractor 20. The draft frame 60 preferably comprises two pairs of beams 61, 62 which are fixed together at their forward ends and pivotally connected to the angle brackets 26 by pivot bolts 63. The lower pair of beams 61 converges rearwardly, passing under beam 52 with a liberal clearance, and is joined, as by welding, to the lower end of a vertically disposed angle iron post 64 arranged slightly to the rear of beam 52. The upper pair of beams 62 also converges rearwardly, extending diagonally upward and joining the upper end of the post 64 to which the beams are likewise fixed. A beam 65 extends rearwardly from the lower end of post 64 to a point in line with the rake heads 33 and is braced by an angle iron strut 66 which extends from the top of the post 64 to the rear portion of the beam 65. The weight of the frame 60 is carried on a supporting caster wheel 70 which is journaled in the forked end of a wheel post 71, and the latter is swiveled in a vertical sleeve 72 carried by the draft frame 60 immediately ahead of the post 64.

Each of the rake head beams 33 is provided at its inner end with a ball-ended stub shaft 73 which is disposed coaxially with the rake head beam and projects laterally beyond the end thereof. The rear end of the beam 65 is also provided with a complementary socket member 74 adapted to receive the ball portions of each of the shafts 73, forming a ball and socket connection between the beam 65 and either rake head 33. Thus, each of the rake heads 33 is supported at its opposite ends on carrying wheels, and either rake head is free to swing vertically relative to the other as the carrying wheels follow irregularities in the ground surface.

The rake head 33 is dumped by means including a transverse shaft 75 which is journaled at its ends in bearings 76 carried in upright posts 80 which are fixed to the ends of the beam 52. The mid portion of the shaft 75 is supported in two bearings 81, 82 which are spaced apart sufficiently to receive between them certain driving gear that will be hereinafter described. The outer ends of the shaft 75 are provided with crank arms 83, and a link 84, which is pivotally connected with the crank, extends rearwardly to a standard 85 secured to and rising from the horizontal flange of the rake head 33. A pivot 86 connects the rearward end of the link 84 with said standard. Thus it will be seen that rotation of the shaft 75 and cranks 83 acts to swing the rake head 33 and attached rake teeth between dumping and raking positions. A hand lever 90 fixed to the standard 85 permits swinging the rake head by hand when necessary, and when engaged and held down by the transport hook 41, holds the rake head up in the raised position for transport.

The transverse shaft 75 is intermittently driven by power derived from the power takeoff shaft 91 which projects rearwardly from the tractor body, and transmitted back to the shaft 75 through driving means and self-interrupting clutch means to be described hereinafter. A driving sprocket (not shown) fixed on the power takeoff shaft 91 operatively engages a chain 92 which is trained over a driven sprocket 93 journaled in a suitable bearing 94 carried on a U-shaped frame 95 which is fixed to the angle brackets 26. The chain 92 is also trained over a chain tightener sprocket 96 journaled in bearing means adjustably supported, in any suitable manner, on the tractor drawbar 100.

From the driven sprocket 93, power is transmitted back through a drive shaft 101 having universal joints 102, 103 at each end thereof, to drive a bevel pinion 104. The latter is journaled in a bearing sleeve 105 which is fixed, as by welding, to a supporting arm 106 extending forwardly from the vertical post 107 supporting bearing 82. Operatively engaging the bevel pinion 104 in driving relation is a gear 110 which is journaled for rotation on the transverse shaft 75 and is adapted to be rigidly connected therewith, at option, by means of a self-interrupting toothed clutch 111. The latter is of conventional type well known to those skilled in the art and preferably comprises a driving member 112 fixed to the gear 110, and a driven member 113 which is slidably but non-rotatably mounted on the shaft 75, as by splines or the like. The driven member 113 is in the form of a sleeve having teeth provided at one end adapted to cooperate with complementary teeth formed on the driving member 112, and is moved axially into and out of engagement therewith by means of a shifting fork 114 which engages a groove 115 formed in the sleeve 113. The shifting fork 114 is pivotally supported at 116 on a member 120 fixed to the arm 106, and is bent laterally from the pivot connection 116 to provide a bell crank arm 121. A trip rope 122 is secured to the end of the arm 121 and extends rearwardly therefrom through a pulley 123 and then forwardly to the tractor seat 124 to which it is fastened within easy reach of the operator. The clutch 111 is normally held out of engagement during the raking operation by means of a spring clip 125 which is bolted to the member 120 by a bolt 126 and which engages the bell crank arm 121 to hold the latter in a forward position.

When the operator wishes to dump the rake, he merely pulls on the trip rope 122 to swing the bell crank arm 121 rearwardly, engaging the clutch 111 and locking the shaft 75 with the constantly rotating gear 110. The crank arms 83 fixed to the ends of the shaft 75 swing upwardly and forwardly, pulling the rake head 33 up into dumping position. Near the end of the lifting movement, the clutch 111 is disengaged by a throw-out cam 130 having a hub 131 fixed to the shaft 75 adjacent the bell crank arm 121. The cam 130 contacts the latter, pushing it back to its normal position of disengagement where it is held by the spring clip 125. With the disengagement of the clutch 111, the rake head 33 is allowed to fall by gravity to raking position, swinging the cranks 83 down to the horizontal rearwardly extending position shown in Figure 3, in which the link 84 and crank 83 form a dead center toggle lock for holding the rake head 33 to its raking position. The fall of the rake head is checked by a spring 132 which is fastened at one end to the front bar 34 of the frame 32, and is connected at the other end by a short length of chain 133 to a bracket 134 fixed to the rake head beam 33. The respective lengths of the chain 133 and spring 132 are such that the spring is stretched through only the last few degrees of swing as the rake head drops into raking position, thereby cushioning the shock of the descent and protecting the rake head and teeth against damage.

Another structural embodiment of the present invention is disclosed in Figures 5, 6, 7, and 8, to which reference is now directed. As in the previously described embodiment, the implement under consideration comprises two rake sections 150 and 151 which are connected by means of a draft frame 152 to the rear of a tractor 20 and transversely thereof. Each of the rake sections 150, 151 comprises a frame 153 and a tooth carrying rake head 154 journaled on said frame for swinging between gathering and dumping positions. The frame 153 preferably comprises front and rear transverse bars 155, 156 connected at their mid-points by a fore and after extending beam 160 which projects forwardly beyond the front bar 155, and at a point somewhat to one side of the beam 160 by two oppositely arranged angle bars 161, 162 set with their vertical flanges spaced apart sufficiently to receive between them certain parts that will be hereinafter described. The ends of the front bar 155 are bent back so that they diverge rearwardly and are connected with the rear bar 156. Further bracing is secured by two bracing members 163 which converge forwardly from the front bar 155 and are joined on opposite sides with the beam 160, and also by a bar 164 extending between members 155 and 156 opposite the two angle bars 161, 162, which is connected with the beam 160 by a cross bar 165. The latter two bars 164, 165 serve primarily, however, to support certain operating mechanism that will be described later. The rake head 154 is similar to that described previously, comprising a transverse angle iron beam 166 which is pivotally supported on brackets 170 that are secured to the rear bar 156 at laterally spaced intervals and project rearwardly therefrom. The rake head 154 carries a plurality of rake teeth 171 which are secured to the horizontal flange of the angle iron beam 166 and extend rearwardly therefrom in the usual manner.

Secured to the outer end of each of the rake head beams 166 in axial alignment with the axis of rotation thereof, is a stub axle 172, and pivotally supported thereon is a downwardly extending crank axle 173. A carrying wheel 174 is journaled on the lower end of crank axle 173 and the latter is held vertical by a strut 175 which is connected at one end to a lug 176 provided on the crank axle, and suitably secured at the other end to the rear bar 156.

The forward ends of the beams 160 are each provided with a generally vertically disposed sleeve member 180 which is fixed, as by welding, to the beam end. The spindle portion of a caster wheel axle 181 is journaled within the sleeve member 180, and the carrying wheel 182 is rotatably supported at the lower end of the caster wheel axle 181.

The draft frame 152 connecting the two rake sections 150, 151 to the tractor 20 includes a transverse channel iron beam 183 which extends between and is fixedly secured at its ends to the forward portions of beams 160 immediately behind sleeve members 180. A shaft 184 extends forwardly from the mid-point of beam 183 to a pivotal draft connection 185 with the tractor drawbar 186, and is braced by two bracing members 190 which converge forwardly from the beam 183 and are joined on opposite sides to the shaft 184. A secondary draft member in the form of a channel iron beam 191 is pivotally connected at 185 to the tractor drawbar 186 and extends rearwardly therefrom, passing under the transverse beam 183 with liberal clearance, to a position between the ends of the rake head beams 166. A generally vertical sleeve member 192 is fixed, as by welding, to the beam 191 somewhat forward of the rear end thereof, and journaled in said sleeve member is the spindle portion of a caster wheel axle 193 on which a carrying wheel 194 is journaled. As in the previously described embodiment, the rear end portion of the beam 191 is provided with a socket member at 195 adapted to receive ball members 196 fixed at the inner end of each of the rake head beams 166, to form a ball and socket joint therebetween.

Each of the rake sections 150, 151 is dumped by means comprising a transverse shaft 198 which is journaled within a sleeve bearing 200 fixed to the beam 160 midway between bars 155, 156, and which is provided with a crank arm 201 fixed to one end thereof. A connecting link 202 is pivotally connected at one end to the crank arm 201, and at the other end, by a transverse pivot bolt 203, to a bracket 204 fixed to the horizontal flange of the rake head beam 166 and rising therefrom. Thus, it will readily be seen that by rotating the crank arm 201, the rake head 154 will be pulled upwardly by the link 202 from raking to dumping position.

The rake head 154 is normally held down into raking position by means of a toggle lock indicated generally by the reference numeral 199, comprising a link 205 disposed between the vertical flanges of the two angle bars 161, 162, which link is pivotally connected therewith at its forward end by a pivot 206. A link 210, preferably but not necessarily made up of two parallel bars spaced apart, is pivotally connected with the free end portion of the link 205 by a pivot 211 and extends rearwardly to a standard 212 secured to and rising from the horizontal flange of the rake head beam 166. A pivot 213 connects the rearward end of the link 210 with said standard. Said links thus form a toggle, the members of which are approximately aligned when the rake head is in its operating position shown in Figure 8, but when the rake head is swung upwardly to dump, the toggle breaks upwardly and the link 205 therefore swings forwardly so that the toggle members then assume a position of acute angularity with respect to each other. To prevent the toggle members from coming to a fully aligned position or forming an overcenter lock, a stop 214 is provided between the vertical flanges of the bars 161, 162 and secured thereto by a bolt 215 in position to intercept the free end portion of the link 205 and prevent it from swinging backward and downward far enough to fully align with the link 210.

Pivoted on this bolt 215 is a locking lever 216 which is shaped to provide a hook portion 220, adapted to hook over the pivot bolt 211 between links 205, 210 when the latter are straightened to their normal operating position as shown in Figure 8. Thus the locking lever 216 effectively holds the toggle links in a nearly dead center position, thereby maintaining the rake in a ground engaging position. Since the links are nearly aligned, very little force is exerted against the locking hook 220, therefore only a slight pull against the lever 216 will release the hook portion 220 from the bolt 211, allowing the rake to be dumped by the dumping mechanism. The lever 216 is preferably held in locking position by a spring 221 which is coiled around the bolt 215 and adapted to force the lever 216 yieldingly up against the pivot bolt 211.

Power for driving the dumping mechanism is derived from the tractor power take-off shaft 91 and is transmitted back to said dumping mechanism by transmission means including a coupling member 222 which is adapted to be connected to said power take-off shaft and which is connected to a rearwardly extending telescoping drive shaft 223 by a universal joint 224. The rear end of the drive shaft 223 is connected by another universal joint 225 to a short shaft 226 journaled in the tubular portion 230 of a gear case 231 and having a bevel pinion 232 provided at the rear end thereof. The gear case 231 is rigidly supported on the cross beam 183 in any suitable manner, while the front end of the tubular portion 230 is supported on the shaft 184 by means of an angle bracket 229 to which a lug 228 on the tubular portion 230 is bolted. The bevel pinion 232 is engaged in driving relation with a bevel gear 234 which is fixed on a short transverse shaft 233 journaled in the gear case 231 perpendicular to shaft 236. The ends of shaft 233 project through and beyond the side walls of the gear case 231 and are provided with universal joints 235 and 236 by which shaft 233 is operatively connected with the two laterally extending counter shafts 240, 241. The outer ends of the shafts 240, 241 are likewise provided with universal joints 242 with which they are connected to spindles 243 having sprockets 244 mounted thereon. The spindle 243 is supported on opposite sides of the sprocket 244 in bearings 245 which are carried by the beam 183 in any suitable manner. A driving chain 246 is trained over the sprocket 244 and passes rearwardly to drive a sprocket 250 journaled for rotation on the dump shaft 198. The lower run of the chain 246 is lifted up over the bar 155 by an idler sprocket 247 which is journaled in a bracket 248 fixed to the bar 155 and over which the chain 246 is trained.

The sprocket 250 is locked to the shaft 198 to rotate the latter by means of a self-interrupting clutch 251 comprising a driving member 252 fixed to the sprocket 250 opposite the bearing 200, and driven member 253 which is slidably but non-rotatably mounted, as by splines or the like, on shaft 198. A compression spring 254 encircles the shaft 198 between the driven clutch member 253 and a retaining washer 255 which is held in place at the end of shaft 198 by a nut 256, exerting a force against the driven member tending to hold it into engagement with the driving member 252. With the rake head down in normal raking position, the clutch 251 is held out of engagement, as shown in Figure 7, by means including an engaging lever 260 which is pivotally connected at 261 to the cross bar 165. To disengage the clutch 251, the engaging lever 260 is swung in a clockwise direction, as viewed in Figures 6 and 7, causing the lower end of the lever to bear against a shoulder formed on the driven member 253. The driven member 253 is thus forced back against the pressure of the spring 254 until the teeth of both driving and driven members run clear of each other. The engaging lever 260 is swung between engaged and disengaged positions, and locked in the latter position, by a system of links including a bell crank 262, which is pivotally connected by a pivot bolt 263 to a lug formed by one end of a small cross piece 264 welded to the bar 164. The forwardly extending arm 265 of the bell crank is connected by a link 266 to a triangular shaped toggle member 270 which is pivotally connected at 271 to the other end of the cross piece 264. Another link 272 connects the toggle member 270 with the engaging lever 260 in such manner that the link 272 and toggle member 270 form an over center lock in the disengaged position, which effectively resists the pressure of the spring 254, as shown in Figure 7. The bell crank 262 is swung rearwardly to break the toggle lock and engage the clutch 251 by means of a trip rope 273 which is secured to the outer end of the bell crank arm and passes rearwardly therefrom through a pulley 274 fastened to the rear frame bar 156. From pulley 274 the trip rope 273 passes forwardly through another pulley 275 fastened to the upper end of a post 276 rising vertically from the end of beam 183, and thence forwardly to the tractor body to which it is secured within convenient reach of the operator.

The locking lever 216 is disabled simultaneous with the engagement of the clutch 251 by means of a trip cord 280 which is secured to the end of the locking lever 216 and passes downwardly and rearwardly therefrom through a pulley 281 fastened to the frame bar 156 and thence forwardly to a point somewhat ahead of pulley 275, where it is joined, as by a clip 282, to the trip rope 273. Thus, a pull on the trip rope 273 is also transmitted through the trip cord 280 to the lever 216, unlocking the toggle at the same time the clutch 251 is engaged, and the rake head 154 is swung upwardly to dump.

Disengagement of the clutch 251 at the end of movement of the rake head is effected by a throw-out device including a tube 283 which is connected at one end by a transverse pivot bolt 284 to a bracket 285 swiveled on the rakehead beam 166. A rod 286 is pivotally connected to the bell crank arm 262 near the outer end thereof, and is slidably disposed within the tube 283 in telescopic relation, the lengths of tube and rod being such that the end of the rod will not come out of the tube when the bell crank arm 262 is in its extreme forward position. An adjustable limit stop 290 is fixed to the rod 286 so that as the rake head beam 166 reaches a predetermined position, the end of the tube 283 will contact the limit stop 290, and further movement of the rake head and tube forwardly will push the rod 286 and bell crank arm 262 forwardly. At the moment the clutch 251 is disengaged by the forward swinging of the bell crank 262, the links 270 and 272 pass over dead center, and the rake head 156 returns to raking position by gravity, leaving the bell crank and rod 286 locked in the forward, or disengaged position. Likewise, as the rake head returns to raking position, the toggle members 205 and 210 straighten out and the locking lever 216, urged forward by the spring 221, hooks over the bolt 220 to lock the toggle down into position.

Another embodiment of the present invention is shown in Figure 9, in which a single section rake is used, although it is to be understood that either single section or multi-section structure might be used interchangeably with the several types of dumping mechanism. The general framework as well as certain of the operating units such as the toggle mechanism and clutch throwout device are similar to those described in the preceding embodiment and illustrated in Figures 5, 6, 7 and 8 in connection with either of the rake sections 150, 151, and therefore such similar parts have been given similar reference numerals with the suffix $a$. In general, it is deemed sufficient to state that the implement comprises a frame connected by forwardly extending central shaft 291 to a freely movable draft connection 185 with the draft frame 186 of a tractor 20. Bracing struts 292 converge forwardly from the front frame bar 155a and are fixed to opposite sides of the shaft 291. A rake head 154a is pivotally connected to the frame by means of laterally spaced brackets 170a extending rearwardly from bar 156a, and is supported at opposite ends on carrying wheels 174a. As in the preceding embodiment, the rake head 154a is held down into raking position by a toggle 199a, and is swung upwardly to dump by means of a self-interrupting clutch 293 which is similar in many respects to the clutch 251. In this embodiment, however, the trip rope 280a for disabling the locking lever 216a is passed through a pulley 281a and thence forwardly to the tractor seat to which it is tied within easy reach of the operator.

The principal difference between this and preceding embodiments, however, lies in the means employed to drive the clutch 293. Whereas preceding embodiments derived power for operating the dumping means from the power takeoff shaft, the structure under consideration employs an operating connection between the clutch 293 and engine driven power lift mechanism 294 carried at the rear end of the tractor 20. The said power lift mechanism includes a transverse rock shaft 295 projecting laterally beyond the ends of the power lift housing, and the usual control pedals 296. A lifting arm 300 having a hub 301 is fixed to the end of the rock shaft 295 in a manner well known to those skilled in the art.

The clutch 293 includes a transverse shaft 302 which is journaled in a bearing sleeve 303 suitably supported on the member 291. The driven clutch member 304 is journaled on the shaft 302 adjacent the end of the bearing sleeve 303 and is provided with a crank arm 305 which is connected by a link 202a to a bracket 204a rising from the rake head beam 166a. The driving member 306 is slidably but non-rotatably mounted, as by splines, on the outer end of the shaft 302 and is provided with a reel portion 310, the purpose of which will be disclosed shortly. As in the preceding embodiment, the clutch 293 is actuated by a bell crank 262a acting through a system of linkage upon an engaging lever 260a which is brought to bear against a shoulder provided on the driving member 306. In place of the trip rope used previously to trip the bell crank, we have substituted a rod 311 which is pivotally connected at 312 to the bell crank 262a and extends forwardly therefrom to a hand lever 313 swingably mounted on the tractor within convenient reach of the operator. The forward end of the rod 311 is likewise pivotally connected with the lever 313.

The dumping clutch 293 is driven from the power lift mechanism 294 by means of a rope 314 which is secured to the lifting arm 300 in any suitable manner, passing rearwardly therefrom through a pulley 315 fastened to the shaft 291 adjacent the draft connection 185 and thence rearwardly to the reel portion 310 of the clutch member 206, about which the rope is wrapped several times to secure a frictional grip. The end of the rope is then passed forwardly and fastened to one end of a spring 316, the other end of which is hooked through an apertured lug 320 provided on the forward portion of the adjacent strut 292.

The operation of the implement is as follows:

With the rake head in normal raking position, the power lift arm 300 is in its extreme rearward position, and the rope 314 is stretched taut by the spring 316. As in the preceding embodiment, the bell crank arm 262a is in its forward position, holding the clutch 293 out of engagement through the action of the toggle link members on the engaging lever 260a. Likewise, the toggle members 205a, 210a are held down in nearly aligned position by the locking lever 216a.

To dump the rake, the operator first pulls the trip rope 280a to unlock the toggle 199a, and at the same time pulls the hand lever 313 rearwardly to engage the clutch 293. He then depresses either or both of the control pedals 296 to actuate the power lift mechanism and rock the lifting arm 300 forwardly, pulling the rope 314 with it. The tightly wrapped rope causes the clutch driving member 306 to rotate, and with it the driven member 304 and crank arm 305 thereby lifting the rake head 154a. The spring 316 stretches as the rope is pulled forwardly, resisting sufficiently to maintain the required tension of the rope on the reel 310. As the rake head nears the end of its lifting movement, the tube 283a contacts the limit stop 290a, pushing the bell crank forwardly to disengage the clutch 293, and causing the rake head to drop back by gravity to raking position. Inasmuch as the operation of dumping the rake is generally completed before the power lift arm 300 has completed its full swing, the latter continues its forward movement idly rotating the disengaged clutch member 306.

In the particular type of power lift illustrated, the control pedals 296 must be depressed a second time to return the lifting arm 300 to its original position, and in order that this may be done automatically we have provided a bar 321 which is welded or otherwise fixed to the lifting arm 300 and projects laterally inward therefrom to contact and depress the adjacent pedal 296 at the extreme forward position of the arm 300. By thus depressing the pedal, the power lift is actuated again to rock the rock shaft 295 and lifting arm 300 rearwardly.

Another embodiment of the present invention featuring dumping means driven from the tractor power lift mechanism is shown in Figures 10, 11 and 12. In general, the structural framework of this embodiment is quite similar, with the exception of the dumping means, to that illustrated in Figure 9, and therefore such parts as have already been described have been given similar reference numerals with the suffix "b."

Referring now to Figures 10, 11 and 12, the dumping mechanism, indicated generally by reference numeral 322, comprises a transverse bearing sleeve 323 which is suitably fixed to the beam 291b intermediate bars 155b, 156b, and journaled therein is a shaft 324, both ends of which project beyond the ends of the bearing 323. A sheave wheel 325 of relatively large diameter is fixed to one end of the shaft 324, while a spool-shaped reel 326 of much smaller diameter is fixed to the other end thereof. A dump rope 330 which is fastened at its rear end to a bracket 331 rising from the rake head beam 166b is passed through the groove in the sheave wheel 325 and securely fastened to the wheel 325 in any suitable manner. Thus, when the wheel 325 is rotated in a clockwise direction, as viewed in Figure 11, the rake head 154b will be pulled up to dumping position by the dump rope 330. Immediately before the rope 330 begins to exert a pull on the rake head beam, however, the toggle lock 199b is unlocked by means of a trip cord 280b which is secured to the locking lever 216b and passes downwardly and rearwardly therefrom through a pulley 281b fastened to the frame bar 156b and thence diagonally forward. The end of the cord 280b is fastened by a hook 332 to a lug 333 provided on the side of the sheave wheel 325 near the outer rim thereof. The lengths of the dump rope 330 and trip cord 280b are such that the latter is stretched tight and begins to exert a pull on the locking lever 216b while the dump rope 330 is still slack, and the latter is not stretched tight until after the locking lever 216b has been pulled clear of the bolt 220b and the toggle lock 199b is unlocked.

The dumping mechanism 322 is driven from the tractor power lift 294 by means of a rope 334 which is secured at its front end by a hook 335 to a lever arm 336 disposed at one end of the rock shaft 295 and comprising part of a self-tripping device, indicated generally by the reference numeral 337. From this point, the rope 334 passes diagonally rearward through a pulley 340 loosely fastened, as by a hook bolt 341 and lock nuts 342, to a bracket portion 343 of a supporting frame 344 fixed to and rising from the shaft 291b. Preferably, the pulley 340 is disposed directly above the pivotal draft connection 185 so that the distance from lever arm 336 to pulley 340 to dumping mechanism 322 remains substantially constant when the tractor turns relative to the rake, and the tendency of the rope to pull on the dumping mechanism is minimized. The rear end of the rope 334 is wrapped several times around the reel 326 to secure a frictional grip, and is fastened to a spring 345 which, in turn, is hooked through an apertured lug 346 provided in the adjacent strut 292b.

The self-tripping device 337 comprises a hub 350 adapted to be non-rotatably mounted on the power lift rock shaft 295 and having a plate 351 in the shape of a sector fixed to the outer end thereof. A shaft 352 projects laterally outward from the face of the plate 351 coaxial with the rock shaft 295, and the lever arm 336 is journaled thereon. A compression spring 353 held by a retaining washer 354 and nut 355 which is in threaded engagement with the end of the shaft 352, bears against the lever arm 336 holding it against the plate 351. The plate 351 is provided with an ear 356 projecting outwardly therefrom and normally abutting against the back edge of the lever arm 336, as best shown in Figure 11. A vertical bar 360 is bolted to the adjacent implement mounting bosses 24 and rises vertically thherefrom to a point somewhat above the rock shaft 295 where it is bent rearwardly, as at 361. Two rods 362, 363 are welded to the rearwardly bent portion 361 of the bar 360 in spaced relation and project laterally outward therefrom slightly beyond the plane of the lever arm 336 to form limit stops for said arm. A plate 364 is welded to the underside of rod 363 in the path of lever arm 336 and at an outwardly directed angle relative thereto so that as the sector 351 and lever arm 336 are rotated forwardly on the rock shaft 295, the lever arm 336 will contact the plate 364 and be pushed outwardly thereby along the shaft 352 and against the pressure of the spring 353 until the lever arm 336 clears the ear 356. As soon as the sector 351 and lever arm 336 are thus disconnected, the latter is pulled back against the rod 362 by the weight of the rake head 154b pulling on the rope 334, while the sector 351 continues its rotation with the rock shaft 295 until the latter has reached its forward terminal position. As on the previous embodiment we have provided a bar 365 welded to the hub 350 and suitably bent to miss the bar 360, which contacts and depresses the control pedal 296 during the last few degrees of rotation of the rock shaft 295, thereby actuating the power lift once again to return the rock shaft and sector to their original positions. The angular back side of the ear 356 acts as a cam surface to push the lever arm 336 outwardly along the shaft 352 as the ear 356 slides under the lever arm.

Figures 13, 14 and 15 illustrate a modified form of the previously described embodiment, in which the self-tripping device is mounted on the implement shaft to facilitate connecting and disconnecting the rake from the tractor 20. Structural elements similar to those previously described are given the same reference numerals with the suffix c.

The vertical bar 360c of the self-tripping device 337c is fixed, as by welding, to the shaft 291c directly behind the draft connection 185, and is braced by a strut 370 which extends downwardly and rearwardly from the upper portion of the bar

360c to connect with the shaft 291c. A pair of bearing brackets 371 are fixed to the strut 370 on opposite sides thereof, and journaled in said brackets in position corresponding to that taken by the power lift rock shaft 295 in the preceding embodiment is a shaft 372. The sector 351c is non-rotatably fixed on one end of the shaft 372 and is provided with a lever arm 336c which is journaled on a shaft 352c and is urged against the sector by a spring 353c. Another lever arm 373 is fixed to the other end of the shaft 372 and is extended downwardly beyond the shaft 372 to provide an extension arm 385 to which a spring 384 is fastened, said spring being anchored to the vertical bar 360c. A rope 374 is fastened to the upper end of the lever arm 373 and passed forwardly through a pulley 375, to be secured by a hook 376 to a lifting arm 377 fixed on the power lift rock shaft 295. The pulley 375 is connected by a hook 380 and lock nuts 381 to a bracket 382 which is fixed to the vertical bar 360c and extends forwardly therefrom to a point above the pivotal draft connection 185.

When the power lift 294 is actuated by depressing the control pedals 296, the rock shaft 295 and lifting arm 377 are rocked forwardly pulling the rope 374 with them. This, in turn, swings the lever arm 373 forwardly, and with it the sector 351c and lever arm 336c, pulling the rope 334c to dump the rake head 154c. At the same time the spring 384 is stretched. The lever arm 336c is disengaged from the sector 351c by the cam action of the plate 364c and is pulled back by the weight of the rake head to its original position of rest against the stop 362c, while the lever arm 373 and sector 351c continue rotating with the rock shaft 295 as the latter completes its full swing. As on the preceding embodiments, the power lift 294 is automatically actuated again by a trip bar 383 which is welded to the lifting arm 377 and depresses the control pedal 296 during the last few degrees of rotation of the rock shaft. The lifting arm 377 is returned to its original position by the action of the power lift mechanism, while the lever arm 373 and sector 351c are pulled back to their normal positions of rest by the stretched spring 384.

While we have shown and described above a few of the structures in which the principles of the present invention have been embodied, it is to be understood that our invention is not to be limited to the specific details shown and described above, but that, in fact, widely different means may be employed in the practice of the broader aspects of our invention.

What we claim, therefore, and desire to secure by Letters Patent is:

1. In combination with a tractor, a dump rake comprising a wheel supported frame, a toothed rake head connected to said frame for movement between raking and dumping positions, draft means connecting said frame to the tractor for vertical movement relative thereto, mechanism for dumping said rake head comprising a continuously rotating driving member journaled on said frame and movable bodily therewith, means for driving said continuously rotating member from the tractor engine, a normally stationary driven member journaled on said frame, means for connecting said driven member with said driving member to rotate therewith, operating connection between said driven member and said rake head for moving the latter to dumping position when the driven member is rotated, and means operable to disconnect said driven member from said driving member when said rake head has been dumped.

2. In combination with a tractor having a power take-off shaft projecting rearwardly from the tractor body for delivering rotary power to implements associated with the tractor, a dump rake comprising a wheel supported frame, draft means connecting said frame to said tractor for relative vertical movement, a toothed rake head pivotally supported on said frame for swinging between gathering and dumping positions, dumping means mounted on said frame and movable vertically therewith for swinging said rake head between said gathering and dumping positions, and driving connection between said power take-off shaft and said dumping means for operating the latter.

3. In combination with a tractor, a dump rake comprising a pair of laterally spaced rake sections, draft means connecting said rake sections to said tractor for vertical movement relative thereto, means for supporting the adjacent ends of said rake sections comprising a wheel supported draft member connected to the tractor for vertical swinging movement and to which said adjacent ends are swingably connected, and supporting wheels journaled at the outer ends of said rake sections, for supporting said connected ends, and means for dumping each of said rake heads.

4. In combination with a tractor, a dump rake comprising a generally transverse draft frame connected to the tractor for vertical swinging movement, a pair of laterally spaced rake sections connected to said draft frame, a longitudinally disposed wheel supported draft member connected to the tractor for vertical swinging, means swingably connecting the adjacent ends of said rake sections with said longitudinal draft member, and supporting wheels journaled on the outer ends of said rake sections.

5. In combination with a tractor, a dump rake comprising a plurality of rake sections, each including a frame and a toothed rake head pivotally connected thereto for swinging between raking and dumping positions, draft means for connecting said rake sections to said tractor in laterally spaced relation, a transverse shaft journaled on said draft means, said shaft having crank arms opposite each of said rake sections, link means connecting their respective crank arms with said rake heads and operative to swing the latter between said raking and dumping position when the transverse shaft is rotated, and means for transmitting power from the tractor engine to drive said transverse shaft including a self-interrupting clutch in serial connection therewith.

6. In combination with a tractor having a power take-off shaft, a dump rake comprising a pair of rake sections, each including a frame and a toothed rake head journaled thereon for swinging between raking and dumping positions, a draft frame connecting said rake sections to the rear of said tractor and transversely thereof, a countershaft journaled on said draft frame, power transmission means connecting said power take-off shaft with said countershaft to drive the latter, and dumping means comprising a self-interrupting clutch mounted on each of said frames, operating connection between each of said clutches and its respective rake head for swinging the latter between said raking and dumping positions when the clutch is engaged, driving means connecting said countershaft with each of said clutches to operate the latter, and control means for engaging said clutches.

7. In combination with a tractor, a dump rake comprising a pair of rake sections, carrying wheels for supporting the outer ends of said rake sections, a draft frame connecting said rake sections to the rear of said tractor, a pair of laterally spaced ground wheels journaled on said draft frame, a secondary draft member swingably connected to said tractor body and extending rearwardly therefrom, a supporting wheel journaled on said secondary draft member, and means for flexibly connecting the inner ends of said rake sections to said secondary draft member.

8. In combination with a tractor, a dump rake comprising a pair of rake sections, each including a frame and a toothed rake head journaled thereon for swinging between raking and dumping positions, carrying wheels for supporting the outer ends of said rake sections, a draft frame for connecting said rake sections to the rear of said tractor and transversely thereof, said draft frame comprising a transverse beam supported on carrying wheels journaled at the ends thereof, means for connecting said beam to the tractor body for vertical movement relative thereto, means for connecting each of said rake sections to said transverse beam, a secondary draft member comprising a beam swingably connected to said tractor body and extending rearwardly therefrom, a supporting wheel journaled on said secondary draft member, means for flexibly connecting the inner ends of said rake sections to said secondary draft member, a normally rotating transverse countershaft journaled on said transverse beam, means for driving said countershaft from the tractor engine, dumping means mounted on each of said rake section frames and operatively connected with its respective rake head to swing the latter between said raking and dumping positions, and means for driving said dumping means from said normally rotating countershaft.

9. In combination with a tractor having power lift mechanism including a rotatable rock shaft, a dump rake comprising a frame and a toothed rake head pivotally connected thereto for dumping, draft means connecting said frame to the tractor body, clutch mechanism comprising a driving member and a driven member, both rotatably supported on said frame, operating connection between said clutch driven member and said rake head for dumping the latter when the clutch is engaged, means connected with said power lift rock shaft for rotating said clutch driving member means for engaging said clutch, and means responsive to the movement of said rake head relative to said frame past a predetermined position for disengaging said clutch.

10. In combination with a tractor having power lift mechanism including a rotatable rock shaft, a dump rake comprising a wheel supported frame, a toothed rake head supported on said frame for swinging between raking and dumping positions, draft means connecting said frame with said tractor for vertical movement relative thereto, a rotatable dumping member journaled on said frame, and connected with said rake head for swinging the latter between said raking and dumping positions, flexible means for transmitting energy from said power lift rock shaft to drive said rotatable dumping member, and means disposed in serial connection with said flexible means for interrupting the transmission of energy to said dumping member comprising a rotatable driving member connected with said rock shaft, a rotatable driven member connected with said dumping member, means connecting said driven member with said driving member to rotate therewith, and means operable to disconnect said driven member from said driving member when said rake head has reached a predetermined position relative to said frame.

11. In combination with a tractor having power lift mechanism including a transverse rock shaft and control means for actuating said mechanism, a dump rake comprising a frame, a toothed rake head supported on said frame for swinging between raking and dumping positions, carrying wheels, draft means connecting said frame to the rear of said tractor and transversely thereof, toggle mechanism connected between said rake head and said frame and operable to hold the rake head in raking position, and dumping means comprising a rotatable member journaled on said frame, means connecting said rotatable member with said rake head to swing the latter between said raking and dumping positions, means operatively connected with said rotatable member for unlocking said toggle mechanism prior to dumping said rake head, means for transmitting energy from said power lift rock shaft to drive said rotatable member, means carried on said frame for interrupting the transmission of energy when said rake head has reached a predetermined position relative to said frame, and means cooperative with said power lift control means when said rock shaft is in the position of maximum lift for returning the rock shaft to its normal position of rest.

12. In combination with a tractor having a pair of driving wheels and an additional driving member connected with the tractor engine for delivering power to actuate implements associated with the tractor, a dump rake comprising a wheel supported frame, a toothed rake head pivotally connected to said frame for vertical swinging between raking and dumping positions, draft means connecting said frame to said tractor for vertical movement relative thereto, clutch mechanism comprising a rotatable driving member journaled on said frame, a normally stationary driven member rotatably supported on the frame, and means for engaging said driven member with said driving member to rotate therewith, power transmission mechanism for driving said clutch driving member from said additional driving member on the tractor, dumping mechanism operatively connected with said clutch driven member for swinging said rake head to dumping position when the clutch is engaged, and means for automatically disengaging said clutch when the rake head has been dumped.

13. In combination with a tractor, a dump rake comprising a generally transversely disposed wheel supported frame, a toothed rake head connected to said frame for swinging movement between raking and dumping positions, draft means pivotally connecting said frame to said tractor for swinging movement relative thereto, a transverse shaft rotatably supported on said rake frame, driving connection between the tractor engine and said transverse shaft for rotating the latter, means connecting said transverse shaft with said rake head for swinging the same to dumping position when the shaft is rotated, and means for interrupting the rotation of said transverse shaft when said rake head has reached dumping position.

14. In combination with a tractor, a dump rake comprising a pair of wheel supported rake sections, each including a frame and a toothed rake head journaled thereon for swinging between raking and dumping positions, a draft frame for connecting said rake sections to the rear of said tractor and transversely thereof, said draft frame comprising a transverse beam supported on carrying wheels journaled at the ends thereof, means for connecting said beam to the tractor body for vertical movement relative thereto, means for connecting each of said rake sections to said transverse beam, a normally rotating transverse countershaft journaled on said transverse beam, means for driving said countershaft from the tractor engine, dumping means mounted on each of said rake section frames and operatively connected with its respective rake head to swing the latter between said raking and dumping positions, and means for driving said dumping means from said normally rotating countershaft.

15. In a dump rake having a frame and a toothed rake head swingably connected thereto for dumping, a power operated clutch driving member journaled on said frame, a clutch driven member rotatably supported on the frame and adapted to engage with said driving member to rotate therewith, means connecting said clutch driven member with said rake head for dumping the latter when the clutch members are engaged, a lever arm pivoted on said rake frame and operable to engage and disengage said clutch members, a pair of telescoping members pivotally connected with said rake head and said lever arm, respectively, and limit stop means on one of said telescoping members adapted to engage the other telescoping member when said rake head has reached a predetermined position relative to said frame whereby further swinging movement of the rake head causes said telescoping members to move said lever arm and thereby disengage said clutch.

16. In combination with a tractor having a rotatable driving member connected with the tractor engine for delivering power to actuate implements associated with the tractor, a dump rake comprising a frame, draft means connecting the frame to said tractor, a toothed rake head swingably connected with said frame for dumping, a clutch driving member journaled on said frame, power transmission means connecting the rotatable driving member on the tractor with said clutch driving member, a clutch driven member rotatably supported on the frame and adapted to engage with said driving member to rotate therewith, means connecting said clutch driven member with said rake head for dumping the latter when the clutch members are engaged, a lever arm pivoted on said rake frame and operable to engage and disengage said clutch members, a pair of telescoping members pivotally connected with said rake head and said lever arm, respectively, and limit stop means on one of said telescoping members adapted to engage the other telescoping member when said rake head has reached a predetermined position relative to said frame whereby further swinging movement of the rake head causes said telescoping members to move said lever arm and thereby disengage said clutch.

17. In combination with a tractor having a rock shaft connected with the tractor engine for delivering power to actuate implements associated with the tractor, a dump rake comprising a frame and a rake head swingably connected thereto for dumping, a rotatable member journaled on said frame and having operating connection with said rake head for dumping the latter, a flexible member trained over said rotatable member in driving connection therewith, and means operatively connecting said flexible member with said rock shaft on the tractor whereby rotation of said rock shaft actuates said rotatable member to dump said rake head.

18. In combination with a tractor having a power lift device including a rock shaft connected with the tractor engine for rotation through a predetermined angle when said power lift is actuated, a dump rake comprising a frame and a rake head swingably connected thereto for dumping, a shaft journaled on said frame for rotation and having operating connection with said rake head for dumping the latter when the shaft is rotated, a reel portion on said shaft, a rope wrapped around said reel portion for frictional driving engagement therewith, means operatively connecting one end of said rope with said power lift rock shaft whereby rotation of the rock shaft causes a pull to be exerted on the rope, thereby rotating said shaft and dumping said rake head, and yielding means connected with the other end of said rope for holding the rope taut.

19. In combination with a tractor having a power lift device including a rock shaft connected with the tractor engine for rotation through a predetermined angle when said power lift is actuated, a dump rake comprising a frame and a rake head swingably connected thereto for dumping, a shaft journaled on said frame for rotation, a sheave wheel of relatively large diameter and a reel portion of relatively small diameter, both fixed on said shaft, a rope fastened to and trained over said sheave wheel, said rope being secured to said rake head in such manner that rotation of said sheave wheel causes the rope to pull the rake head up to dumping position, a second rope wrapped around said reel portion for frictional driving engagement therewith, means operatively connecting one end of said second rope with said power lift rock shaft whereby rotation of the rock shaft causes a pull to be exerted on the rope, thereby rotating said shaft and dumping said rake head, and spring means connected to the other end of said second rope and anchored to said frame for holding the rope taut.

20. For use with a tractor having a rotatable driving shaft connected with the tractor engine for delivering power to actuate implements associated with the tractor, a dump rake comprising a frame and a rake head swingably connected therewith for dumping, means on said frame for dumping said rake head, a rotatable driving member operatively connected with the driving shaft on the tractor, a driven member journaled for rotation relative to said driving member and coaxial therewith, said driven member being operatively connected with said dumping means, a projecting ear on said driving member adapted to engage said driven member and cause it to rotate therewith, and an inclined member positioned in the path of said driven member and adapted to force said driving and driven members apart to disengage the driven member from the ear on said driving member.

21. For use with a tractor having a rotatable driving shaft connected with the tractor engine for delivering power to actuate implements associated with the tractor, a dump rake comprising a frame and a rake head swingably connected therewith for dumping, means on said frame for dumping said rake head, flexible pull transmitting means connecting said driving shaft on the tractor with said dumping means for actuating the latter, and an interrupting device in serial connection with said flexible means, said interrupting device comprising a rotatable driving member, a driven member journaled for rotation relative to said driving member and coaxial therewith, a projecting ear on said driving member adapted to engage said driven member and cause it to rotate therewith, and an inclined member positioned in the path of said driven member and adapted to force said driving and driven members apart to disengage the driven member from the ear on said driving member."

22. The combination with a tractor having a rotatable engine driven member for transmitting power to implements associated with the tractor, of a dump rake comprising a frame and a rake head connected therewith for movement between raking and dumping positions, a rotatable wheel journaled on said frame, a flexible pull transmitting member connected with said rake head and trained over said wheel in driving engagement therewith, and means operatively connected with said rotatable engine driven member for rotating said wheel to pull the rake head up to dumping position.

23. A tractor propelled dump rake comprising a wheel supported frame connected with the tractor for relative vertical movement, a rake head pivoted on said frame for swinging between raking and dumping positions, a rotatable member journaled on said frame and movable bodily therewith, means connecting said member with said rake head for dumping the latter when said member is rotated, and means for intermittently transmitting power from the tractor engine to the rotatable member to drive the latter.

24. In combination with a tractor, a dump rake comprising a wheel supported draft frame connected with the tractor for relative vertical movement, a pair of laterally spaced rake sections connected with said draft frame and movable vertically therewith, supporting wheels journaled on the outer ends of said sections, and ground engaging means flexibly joining the adjacent ends of said sections together.

25. In combination with a tractor having power lift mechanism including an engine driven rock shaft, a dump rake comprising a supporting frame having draft connection with the tractor, a toothed rake head pivoted on said frame for vertical swinging between raking and dumping positions, tension means connecting said rock shaft with said rake head and operative to swing the latter to dumping position when said rock shaft is rocked, and means in serial connection with said tension means for interrupting the transmission of power to said rake head when the latter has reached dumping position.

26. A tractor propelled dump rake comprising a frame having a rake head pivotally connected therewith for swinging between raking and dumping positions, a rotatable dumping member journaled on said frame and having operating connection with the rake head for dumping the same, means for driving said dumping member from the tractor engine, locking means connected with said frame and with said rake head for holding the latter down to raking position, and means responsive to movement of said dumping member for releasing said locking means prior to dumping the rake head.

27. In combination with a tractor, a dump rake comprising a plurality of laterally spaced wheel supported rake sections, each including a frame and a toothed rake head journaled thereon for swinging betwen raking and dumping positions, a draft frame connecting said sections to said tractor for relative vertical movement, a transverse countershaft journaled on said draft frame, means for driving said countershaft from the tractor engine, dumping means mounted on each of said rake section frames and operatively connected with its respective rake head for swinging the latter between raking and dumping positions, and means for driving said dumping means from said countershaft.

28. In a tractor drawn dump rake, the combination of a frame having a rake head pivotally connected therewith for swinging between raking and dumping positions, a pair of toggle links connecting said frame with said rake head and movable between an extended position wherein said toggle links hold the rake head down to raking position and a closed position, a locking lever pivoted on said frame and engageable with said toggle links for holding the same in extended position, power operated dumping means connected with said rake head for swinging the same up to dumping position, and means actuated by said dumping means for disengaging said locking lever from said toggle links to permit the latter to close, said dumping means thereafter swinging said rake head up to dumping position.

29. In combination with a tractor, a dump rake comprising a pair of laterally spaced rake sections connected to said tractor for relative vertical movement, each of said sections having a toothed rake head swingable between raking and dumping positions, a transversely disposed, normally stationary shaft journaled on said sections, means connecting each of said rake heads with said shaft and operative to swing the rake heads from one of said positions to the other when the shaft is rotated, means for driving the shaft from the tractor engine including a clutch, and cam means on the shaft operative to disengage said clutch when the shaft has turned through a predetermined angle.

30. In combination with a tractor, a dump rake comprising a frame, a rake head supported on said frame for vertical movement between raking and dumping positions, a normally rotating member having driving connection with the tractor engine, a normally stationary member journaled on the rake frame and connected with the rake head for raising and lowering the same, a clutch operative to engage said normally stationary member with said normally rotating member so as to rotate therewith, an arm pivoted on the frame and connected with the clutch for engaging and disengaging the same, optionally controllable means for moving said arm so as to engage the clutch, and means for moving said arm to disengage the clutch when the rake head has reached dumping position.

31. In combination with a tractor having a rock shaft, engine driven mechanism operative to rock said shaft alternately in opposite directions, and control means for actuating said mechanism, a dump rake comprising a frame, a toothed rake head supported on said frame for relative vertical movement between raking and dumping positions, means connecting said rock shaft with said rake head and operative to move the latter to dumping position when the rock shaft is rocked in one direction, and means responsive to rotation of said rock shaft through a predetermined angular extent for actuating said control means to reverse the direction of rotation of said rock shaft and return the shaft to its initial position.

32. In a dump rake having a frame, a rake head supported on said frame for movement between dumping and raking positions, and a dumping member connected with said rake head for moving the same to dumping position, locking means connected with said frame and with said rake head for holding the latter down to raking position, and means responsive to initial movement of said dumping member for releasing said locking means prior to dumping the rake head.

WILBUR J. COULTAS.
NOLAN D. COLVIN.

CERTIFICATE OF CORRECTION.

Patent No. 2,237,280. April 1, 1941.

WILBUR J. COULTAS, ET AL.

It is hereby certified that error appears in the printed specification of the above numbered patent requiring correction as follows: Page 7, second column, lines 28, 29, and 30, strike out the comma and words ", for supporting said connected ends, and means for dumping each of said rake heads"; page 8, first column, line 7, claim 7, after "tractor" and before the comma, insert --for relative vertical movement--; and that the said Letters Patent should be read with this correction therein that the same may conform to the record of the case in the Patent Office.

Signed and sealed this 13th day of May, A. D. 1941.

(Seal)

Henry Van Arsdale,
Acting Commissioner of Patents.